(12) United States Patent
Vu

(10) Patent No.: US 6,401,848 B1
(45) Date of Patent: Jun. 11, 2002

(54) THREE-SPEED POWER TAKE-OFF ASSEMBLY

(76) Inventor: Thomas H. Vu, 112 Peace Ave., Bolingbrook, IL (US) 60490

( * ) Notice: Subject to any disclaimer, the term of this patent is extended or adjusted under 35 U.S.C. 154(b) by 0 days.

(21) Appl. No.: 09/427,566

(22) Filed: Oct. 26, 1999

(51) Int. Cl.[7] .............................................. B60K 17/28
(52) U.S. Cl. ....................... 180/53.1; 180/53.3; 74/15.2
(58) Field of Search ............................. 180/53.1, 53.62, 180/247; 74/15.66, 15.63, 11, 15.2, 360, 413

(56) References Cited

U.S. PATENT DOCUMENTS

| | | | |
|---|---|---|---|
| 1,876,561 A | 9/1932 | Brown | |
| 3,065,643 A | 11/1962 | Mark et al. | ................. 74/15.63 |
| 3,081,646 A | 3/1963 | Skrupky | ..................... 74/15.4 |
| 3,352,165 A | 11/1967 | Lee | ............................. 74/15.4 |
| 3,675,497 A | 7/1972 | Thomas | ..................... 74/15.4 |
| 3,830,111 A | 8/1974 | Travaglio | ................... 74/15.4 |
| 4,304,141 A | * 12/1981 | Tone et al. | ................. 180/53.1 |
| 4,805,718 A | * 2/1989 | Iwata et al. | ................. 180/247 |
| 5,063,793 A | * 11/1991 | McAskill | ..................... 74/360 |
| 5,123,293 A | * 6/1992 | Umemoto et al. | ......... 180/53.1 |
| 5,248,283 A | * 9/1993 | Eckhardt et al. | .............. 74/413 |
| 5,755,098 A | * 5/1998 | Irikura | ....................... 180/53.1 |
| 6,003,391 A | * 12/1999 | Kojima et al. | ............. 180/53.1 |
| 6,080,081 A | * 6/2000 | Sauermann et al. | ........ 180/53.1 |

FOREIGN PATENT DOCUMENTS

GB              638922           6/1950

* cited by examiner

Primary Examiner—Lanna Mai
Assistant Examiner—Hau Phan
(74) Attorney, Agent, or Firm—A. N. Trausch

(57) ABSTRACT

A PTO assembly that supplies rotational motion to at least one piece of equipment used in conjunction with a power source. The power source can be mounted on a work vehicle or in a power station. The PTO assembly is coupled to the output shaft of the power source and comprises a PTO housing with an input shaft and an output shaft rotatably mounted in the housing in a spaced apart parallel relationship. Each shaft has mounted on it three gears with corresponding gears on each shaft intermeshed. The input shaft has the three fixed drive gears. The output shaft has a high gear ratio gear and an intermediate gear ratio gear mounted to freewheel until engaged to the output shaft by a splined shift hub moved by a single shift fork. The output shaft also has a low gear ratio gear mounted on an overrunning clutch which allows the low driven gear to freewheel when either of the high driven gear or the intermediate driven gear is engaged to the output shaft.

20 Claims, 3 Drawing Sheets

THREE-SPEED POWER TAKE-OFF ASSEMBLY

FIELD OF THE INVENTION

The present invention relates to power take-off gearing for agricultural and industrial applications, and more particularly to a three-speed power take-off assembly having one shift fork.

BACKGROUND OF THE INVENTION

Power take-off (PTO) assemblies typically are coupled to a power source, such as an internal combustion engine. In some applications, the PTO assembly is attached to a transmission gear box and in other applications it is attached directly to a clutch and the output shaft of the power source.

In the agricultural industry, a PTO assembly is mounted on a tractor and is used to provide rotational motion to one or more farm implements being operated in conjunction with the tractor. The power source of the tractor provides the input power to the PTO assembly. Generally, the PTO assembly houses gear trains that will produce several speeds of rotation of the PTO output shaft. Typical PTO assemblies provide two speeds of rotation, i.e., 540 RPM and 1000 RPM and use one shift fork to move between the two gear trains to produce such speeds of rotation. As more farm implements and different applications of farm implements became available, additional speeds of rotation of the PTO output shaft was desirable or required. However, one shift fork can alternatively engage only two gear trains so in order to provide more than two output speeds of rotation, additional gear trains and shift forks are required to provide three or more speeds of rotation. In other words, in order to obtain three speeds of rotation for the PTO assembly, four gear trains and two shift forks were required. Such arrangements increased the cost of the PTO assembly, as well as increased the complexity of the operation and size of the PTO assembly. The operator of the PTO assembly had to properly select the position of the several shift forks to obtain the appropriate or proper speed of rotation of the PTO output shaft. Some previous PTO assemblies eliminated one gear train but still required two shift forks to obtain a three speed PTO assembly.

Thus, there is a need for a three speed PTO assembly that will provide three speeds of rotation of the PTO output shaft with three gear trains and only one shift fork. There is also a need for a three speed PTO assembly that is simple, and compact to obtain the optimum efficiency between the speed of the power source and an implement's operating RPM.

SUMMARY OF THE INVENTION

According to the present invention a power take-off assembly having three output speeds suitable for a work vehicle or a power station is provided. The PTO assembly supplies rotational motion to at least one piece of equipment used in conjunction with a power source. The power source can be mounted on a work vehicle or in a power station. The PTO assembly is coupled to the output shaft of the power source and comprises a PTO housing with an input shaft and an output shaft rotatably mounted in the housing in a spaced apart parallel relationship. Each shaft has mounted on it three gears with corresponding gears on each shaft intermeshed. The input shaft has the three fixed drive gears. The output shaft has a high gear ratio gear and intermediate gear ratio gear each mounted to freewheel until engaged to the output shaft by a splined shift hub moved by a single shift fork. The output shaft also has a low gear ratio gear mounted on an overrunning clutch which allows the low driven gear to freewheel when either of the high driven gear or the intermediate driven gear is engaged to the output shaft.

Further characteristics and advantages of the present invention will become apparent during the course of the following description, given by way of example only and without any restrictive nature.

DETAILED DESCRIPTIONS OF PREFERRED EMBODIMENTS

Figure 1:
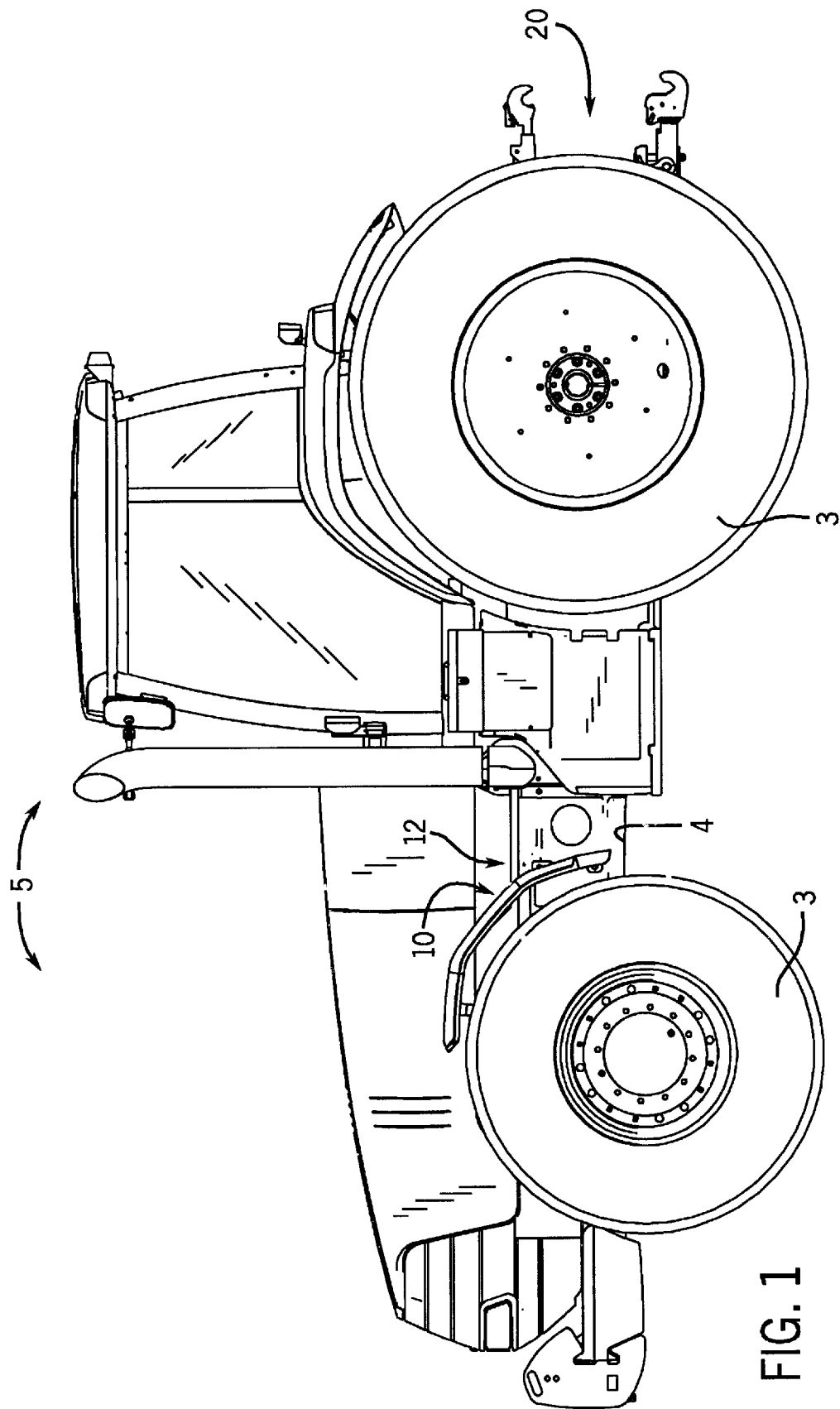
FIG. 1 is a side elevation view of a work vehicle which incorporates the present three speed power take-off assembly.
Figure 4:
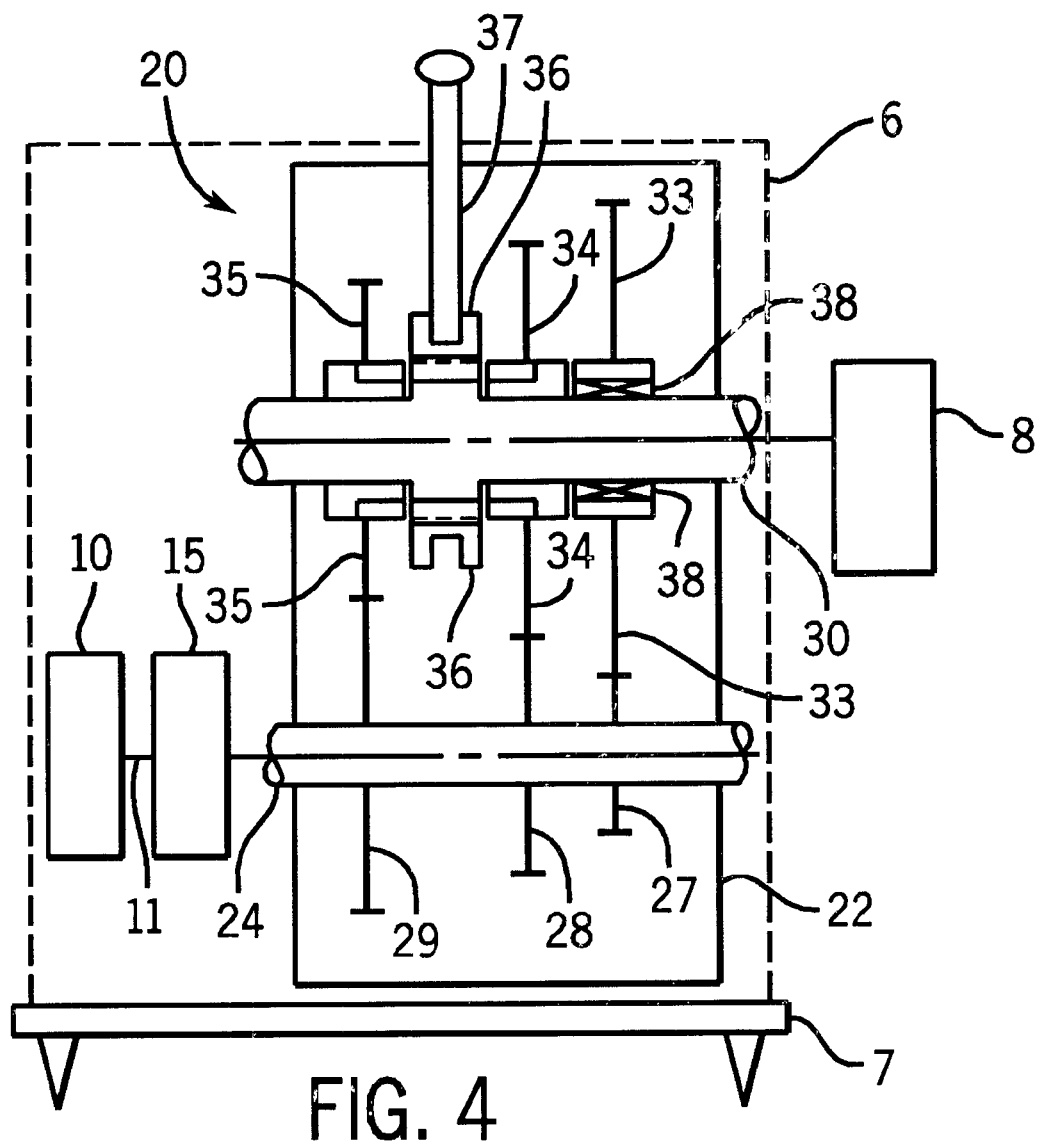
FIG. 4 is a schematic illustration of the present three speed power take-off assembly configured for a low gear ratio output and mounted in a power station.

Referring now to FIG. 1 of the drawings there is shown a work vehicle 5 having a vehicle support structure 4 to which a plurality of wheels 3 are rotatably mounted. Although a four wheel work vehicle is illustrated, it should be understood that a 6 or 8 wheel vehicle is contemplated as well as a tracked vehicle, with the tracks being supported by wheels. A work vehicle 5 typically has a power source 10 coupled to a transmission 12 with the transmission 12 operatively coupled to at least two of the wheels 3. A power station 6 having a power source 10 mounted on a support structure 7 as illustrated in FIG. 4 is also contemplated by the present invention. The power station 6 may be mounted on a trailer or wheel set so that it can be moved from place to place, as well as set on a foundation for a stationary installation. The power source 10, in either the work vehicle 5 or power station 6 embodiment, can be an internal combustion engine such as a gasoline engine or a diesel engine and it may also be an electric motor or a steam driven turbine. The power source 10 has an output shaft 11 to which the transmission 12 and a clutch 15 typically are connected in any convenient and customary manner.

A power take-off (PTO) assembly 20 is coupled to the power source 10. The PTO supplies rotational motion to a piece of equipment 8 such as a cutter, mower, baler or the like. The equipment 8 can be stationary or towed by the work vehicle 5. The PTO assembly 20 can be mounted on the output shaft 11 of the power source 10 or more typically coupled to a clutch 15. See FIGS. 2, 3 and 4. In some embodiments, the PTO assembly 20 is mounted inside the transmission gear box housing with only an output shaft 30 extending out for attachment to the equipment 8. In some applications, the PTO assembly 20 has an output shaft 30 extending toward the front of the work vehicle 5 to operate equipment mounted in front of or on the side of the work vehicle. FIG. 1 illustrates a work vehicle 5 with the PTO assembly 20 mounted to extend from the rear of the vehicle.

The PTO assembly 20 comprises a PTO housing 22 with an input shaft 24 rotatably mounted in the housing with the input shaft 24 coupled to the power source 10. Usually the input shaft 24 is coupled to a clutch 15. See FIG. 2. The preferred method of operation is to stop the rotation of the PTO assembly 20 before changing the gear ratio. Clutch 15 allows the PTO assembly 20 to be disconnected from the power source 10 while the gear ratio of the PTO is changed. The input shaft 24 of the preferred embodiment of the present PTO assembly 20 is provided with a drive gear set and most preferably with three drive gears 27, 28 and 29. The drive gears 27, 28 and 29 are mounted on the input shaft 24 substantially perpendicular to the longitudinal axis of the input shaft 24. The drive gear can be of any conventional type such as a spur, herringbone or helical gear and are fixed to the input shaft 24 in a conventional manner such as by welding. The three drive gears are a low drive gear 27, an intermediate drive gear 28 and a high drive gear 29. Mounted in the housing 22 for rotation in a spaced apart, parallel relationship to the input shaft 24 is a PTO output shaft 30. A portion of the output shaft 30 extends out of the housing so that it can be coupled to equipment 8. The output shaft 30 of the preferred embodiment of the present PTO assembly 20 is provided with a driven gear set and most preferably with three driven gears 33, 34 and 35. The driven gears 33, 34 and 35 are mounted to freewheel on the PTO output shaft 30 and are aligned to intermesh with the three drive gears 27, 28 and 29. The driven gear is the same type of gear as the drive gear, i.e., spur, herringbone or helical. A splined shift hub 36 is slidingly mounted on the output shaft 30 between two of the driven gears 34, 35 and configured to selectively engage one of such driven gears thereby transmitting rotational motion from the PTO input shaft 24 to the PTO output shaft 30. The transfer of torque is thereby accomplished through the intermeshing of the drive gear set and the driven gear set, to the output shaft 30 and then to the equipment 8.

Figure 2:
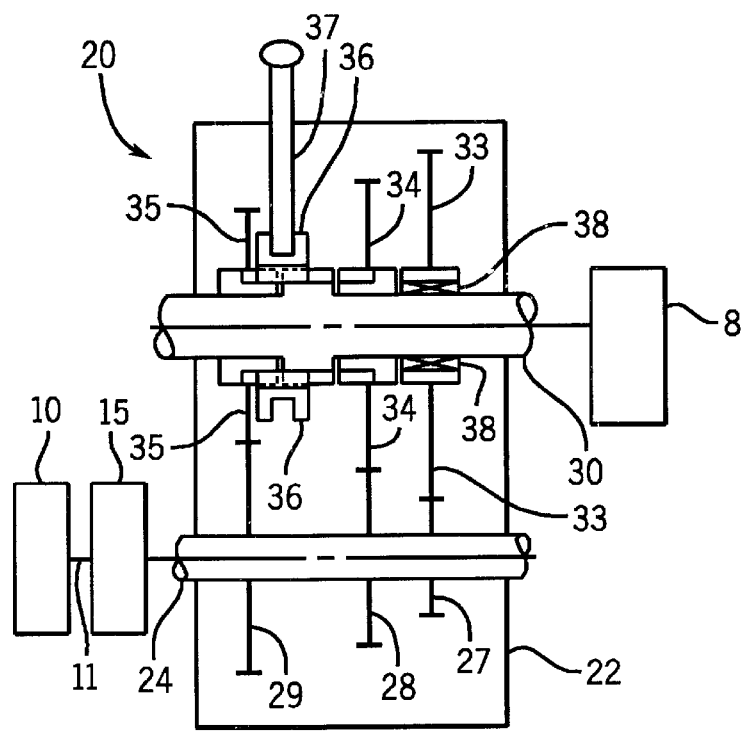
FIG. 2 is a schematic illustration of the present three speed power take-off assembly configured for a high gear ratio output.
Figure 3:
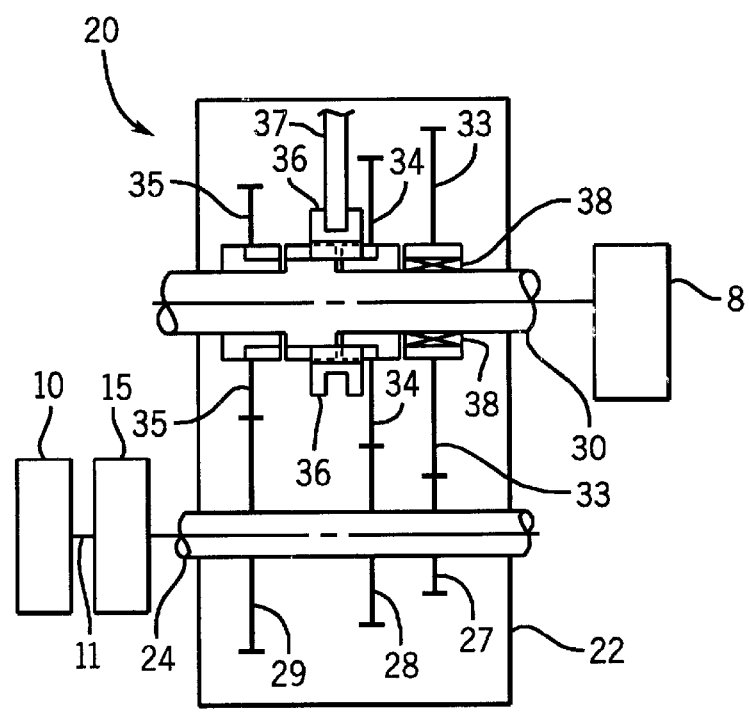
FIG. 3 is a schematic illustration of the present three speed power take-off assembly configured for an intermediate gear ratio output.

An overrunning clutch 38 is mounted on the PTO output shaft 30 axially between the PTO output shaft 30 and one of the driven gears, wherein torque is transmitted by the overrunning clutch 38 from the driven gear to the output shaft 30 when the overrunning clutch 38 is engaged. In the preferred embodiment, as illustrated in FIGS. 2, 3 and 4, the overrunning clutch 38 is mounted with the low driven gear 33. The overrunning clutch 38 can be a sprag clutch, a roller-type clutch or a strut-type one-way clutch.

In operation the PTO assembly 20 supplies rotational motion to at least one piece of equipment 8. In the present PTO assembly 20 the drive gears 27, 28 and 29 are intermeshed with the driven gears 33, 34 and 35. The low gear ratio gears 27 and 33 typically turn at 500 RPM, the intermediate gear ratio gears 28 and 34 typically turn at 750 RPM and the high gear ratio gears 29 and 35 typically turn at 1000 RPM. It should be understood that the actual RPM for a given gear train may vary because of tolerances and manufacturing variances and that different gear ratios may be used to obtain different RPM speeds.

In the present PTO assembly 20, the high driven gear 35 and the intermediate driven gear 34 are freewheeling on the output shaft 30. The low driven gear 33 is mounted on the overrunning clutch 38 on the output shaft 30. When the splined shift hub 36 is in the neutral position, i.e., not engaged with either of the two driven gears 34, 35 on its sides, the low gear ratio gear train 27 & 33 drives the output shaft 30 through the overrunning clutch 38. The high gear ratio gear 34 and intermediate gear 35 ratio gear free wheel about the output shaft 30. When the splined shift hub 36 is moved with the shift fork 37 to either the high driven gear 35 or the intermediate driven gear 34, the engaged gear drives the output shaft 30 at its given speed. The non-engaged gear free wheels about the output shaft 30. The low driven gear 33 also freewheels because the output shaft 30 is turning at a speed faster than the low gear ratio gear train 27 & 33 which thereby disengages the overrunning clutch 38. The splined shift hub 36 is moved by the shift fork 37. The shift fork 37 can be moved by mechanical linkages manually or by a fluid actuator controlled manually or electronically. The shift fork 37 can extend from the PTO housing 22 or it can be internal to the housing with appropriate activation controls.

Thus, there is provided a three speed power take-off assembly 20 that uses only one shift fork 37 in combination with an overrunning clutch 38 that can be used with a work vehicle or a power station that is stationary or mobile to provide rotational motion to a piece of equipment at a selected speed. While several embodiments of the present invention have been disclosed and described in detail herein, various modifications may be made. For example, the preferred embodiment of a work vehicle describes a vehicle having a frame that supports the power source, transmission and wheels. Some vehicle structures such as agricultural tractors don't have a frame as a support structure but use the engine block and transmission housing as part of the support structure for the wheels and axles. By way of further modification, the overrunning clutch may be mounted in association with the high gear ratio gear train. Such modifications and variations in use are intended to fall within the scope of the appended claims.

What is claimed is:

1. A work vehicle comprising:

a vehicle structure;

a plurality of wheels rotatably mounted on the vehicle structure, a power source having an output shaft mounted on the vehicle structure and coupled to a transmission with the transmission operatively coupled to at least two of the wheels; and, a PTO assembly for supplying rotational motion to at least one piece of equipment, the PTO assembly comprising:

a PTO housing;

a PTO input shaft rotatably mounted in the housing and coupled to the power source;

a plurality of drive gears mounted on the input shaft, including a low drive gear, an intermediate drive gear and a high drive gear;

a PTO output shaft rotatably mounted in the housing in a spaced apart, parallel relationship to the PTO input shaft;

a plurality of driven gears mounted to freewheel on the PTO output shaft, including a low driven gear, an intermediate driven gear and a high driven gear and aligned to intermesh with the corresponding drive gears;

a splined shift hub slidingly mounted on the output shaft between the intermediate and high driven gears and configured to selectively engage one of such driven gears thereby transmitting rotational motion from the PTO input shaft to the PTO output shaft; and an overrunning clutch mounted on the PTO output shaft axially between the PTO output shaft and the low driven gear, wherein torque is transmitted by the overrunning clutch from the low driven gear to the PTO output shaft when the splined shift hub is not engaged with one of the intermediate and high driven gears.

2. The work vehicle of claim 1 wherein the overrunning clutch is a sprag clutch.

3. The work vehicle of claim 1 including a clutch coupled between the power source and the PTO input shaft.

4. The work vehicle of claim 1 wherein the overrunning clutch is a roller-type clutch.

5. The work vehicle of claim 1, wherein the overrunning clutch is a strut-type clutch.

6. In a vehicle having X power source for producing rotational motion with an output shaft coupled to a PTO assembly for supplying rotational motion to at least one piece of equipment other than the vehicle, the PTO assembly comprising:

a PTO housing;

a PTO input shaft rotatably mounted in the housing and coupled to the power source;

a plurality of drive gears mounted on the input shaft, including a low drive gear, an intermediate drive gear and a high drive gear;

a PTO output shaft rotatably mounted in the housing in a spaced apart, parallel relationship to the PTO input shaft;

a plurality of driven gears mounted to freewheel on the PTO output shaft, including a low driven gear, an intermediate driven gear and a high driven gear and aligned to intermesh with the drive gears;

a splined shift hub slidingly mounted on the output shaft between the intermediate and high driven gears and configured to selectively engage one of such driven gears thereby transmitting rotational motion from the PTO input shaft to the PTO output shaft; and an overrunning clutch mounted on the PTO output shaft axially between the PTO output shaft and the low driven gear, wherein torque is transmitted by the overrunning clutch from the low driven gear to the PTO output shaft when the splined shift hub is not engaged with one of the intermediate and high driven gears.

7. The PTO assembly of claim 6, including a clutch coupled between the power source and the PTO input shaft.

8. The PTO assembly of claim 7 wherein the overrunning clutch is a sprag clutch.

9. The PTO assembly of claim 7, wherein the overrunning clutch is a roller-type clutch.

10. The PTO assembly of claim 7, wherein the overrunning clutch is a strut-type clutch.

11. A power station coupled to a PTO assembly for supplying rotational motion to at least one piece of equipment, the PTO assembly comprising:

a power source mounted on a support structure and having an output shaft;

a PTO housing;

a PTO input shaft rotatably mounted in the PTO housing and coupled to the output shaft of the power source;

a plurality of drive gears mounted on the input shaft, including a low drive gear, an intermediate drive gear and a high drive gear;

a PTO output shaft rotatably mounted in the housing in a spaced apart, parallel relationship to the PTO input shaft;

a plurality of driven gears mounted to freewheel on the PTO output shaft, including a low driven gear, an intermediate driven gear and a high driven gear and aligned to intermesh with the drive gears;

a splined shift hub slidingly mounted on the output shaft between two of the three driven gears and configured to selectively engage one of such two driven gears thereby transmitting rotational motion from the PTO input shaft to the PTO output shaft, and an overrunning clutch mounted on the PTO output shaft axially between the PTO output shaft and the remaining one of the three driven gear, wherein torque is transmitted by the overrunning clutch from the remaining one driven gear to the PTO output shaft when the splined shift hub is not engaged with either of the two driven gears.

12. The power station of claim 11 wherein the overrunning clutch is a sprag clutch.

13. The power station of claim 12, including a clutch coupled to the output shaft of power source and the PTO input shaft.

14. The power station of claim 12, wherein the remaining one driven gear is the lowest gear ratio driven gear on the PTO assembly.

15. The power station of claim 11, wherein the two of the three driven gears are the high gear ratio and the intermediate gear ratio.

16. A power take-off assembly for supplying rotational motion to at least one piece of equipment, the power take-off assembly comprising:

a means for providing power to the power take-off assembly;

a power take-off housing;

an input shaft rotatably mounted in the housing and coupled to the means for providing power;

a means for transferring torque from the input shaft;

an output shaft rotatably mounted in the housing in a spaced apart, parallel relationship to the input shaft;

a means for receiving torque from the input shaft, mounted on the output shaft and in communication with the means for transferring torque; and a means for engaging the means for receiving torque to the output shaft thereby transmitting rotational motion from the input shaft to the output shaft of the power take-off assembly.

17. The power take-off assembly of claim 16, wherein the means for engaging the means for receiving torque is one of a splined shift hub and an overrunning clutch.

18. The power take-off assembly of claim 16, including a clutch coupled between the means for providing power and the input shaft.

19. The power take-off assembly of claim 16, wherein the means for transferring torque is a drive gear mounted on the input shaft and the means for receiving torque is a driven gear mounted on the output shaft and intermeshed with the corresponding drive gear, with the driven gear freely rotating until engaged by the means for engaging.

20. The power take-off assembly of claim 19, wherein there are three drive gears and three driven gears thereby providing a high gear ratio, an intermediate gear ratio and a lower gear ration for the rotational motion of the power take-off assembly output shaft.

* * * * *